June 7, 1960   G. G. FRATER ET AL   2,939,607
STACKABLE AND NESTABLE CONTAINER
Filed Dec. 18, 1958   3 Sheets-Sheet 1
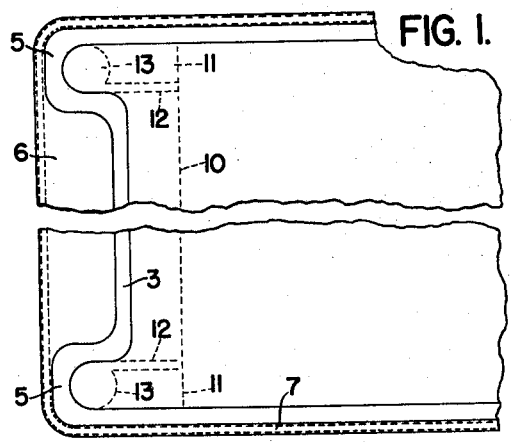
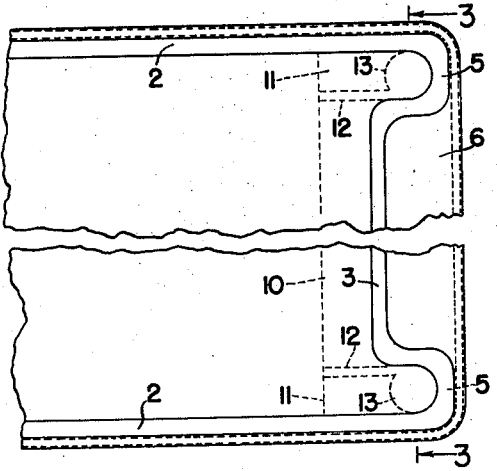
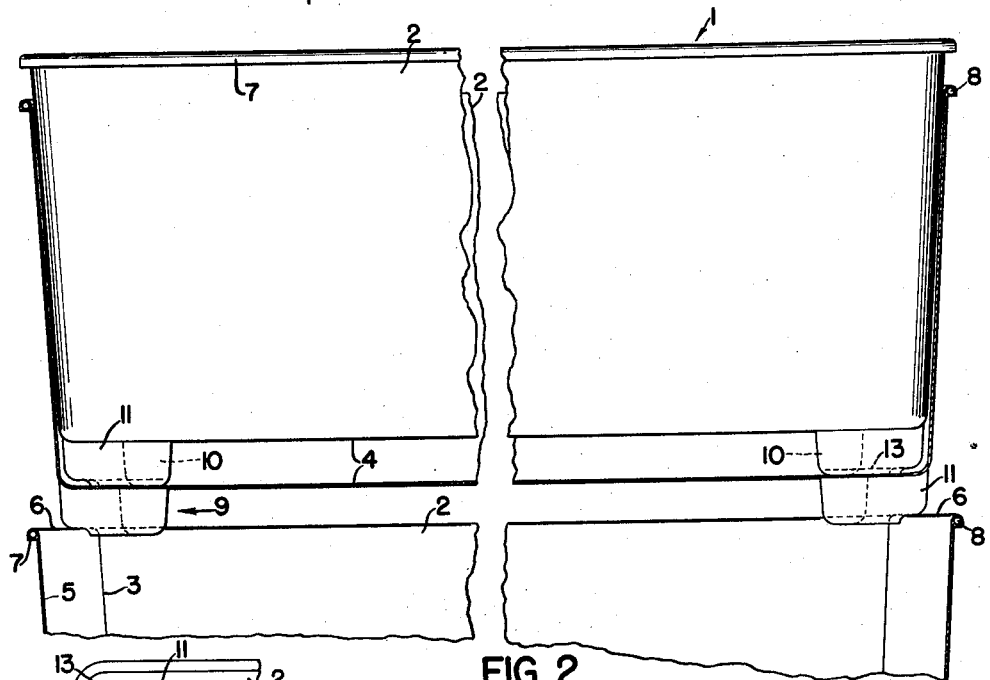
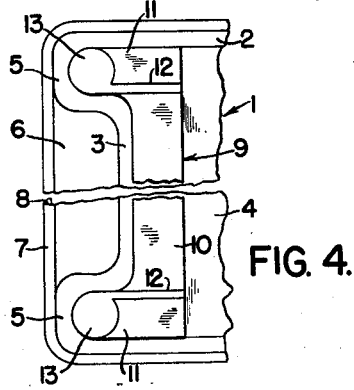
INVENTOR.
GEORGE G. FRATER
MILTON H. FRATER
BY
Attorneys June 7, 1960   G. G. FRATER ET AL   2,939,607
STACKABLE AND NESTABLE CONTAINER
Filed Dec. 18, 1958   3 Sheets-Sheet 3

INVENTOR.
GEORGE G. FRATER
MILTON H. FRATER
BY
Attorneys

United States Patent Office 2,939,607
Patented June 7, 1960

2,939,607

STACKABLE AND NESTABLE CONTAINER

George G. Frater and Milton A. Frater, Watertown, Wis., assignors to G. B. Lewis Company, Watertown, Wis., a corporation of Wisconsin Filed Dec. 18, 1958, Ser. No. 781,258

14 Claims. (Cl. 220—97)

This invention relates to a container and more particularly to a stackable and nestable container.

Containers are frequently fabricated so that they can be either stacked or nested with identically shaped containers. The containers are nested one within another for storage to save space and facilitate handling. When the containers are filled, they are stacked vertically and with the conventional container it is necessary to rotate the container 180° from the nesting position in order to permit stacking. With smaller containers, which are handled manually, the rotating or turning 180° is no serious problem. However, with larger containers, which are handled by a lift truck, it is very inconvenient to rotate the container 180° for stacking.

The present invention is directed to a stackable and nestable container in which it is not necessary to turn the container 180° for stacking. According to the invention, the containers are stacked vertically in a laterally offset relation.

More specifically, the containers are provided with sloping end and side walls for nesting purposes and each end wall is provided with a pair of outwardly extending corrugations at the corners of the container. In one form of the invention, a generally flat rim connects the outwardly extending corrugations at the upper edge of each end wall.

A pair of generally U-shaped skids are formed on the bottom of the container and conform to the contour of the ends of the container. Each skid is provided with a transverse section and a pair of longitudinally extending feet which are located beneath the respective corrugations. Each foot on the skid is provided with a longitudinally extending groove and a recess. In the nesting position, the skid on the upper container rests on the bottom surface of the lower container. In the stacking position, the upper container is lifted from the nesting position and moved laterally so that the groove in one foot of the upper skid engages the top edge of the side wall of the lower container, and the recess formed in the other foot of the upper container engages the flat rim on the lower container.

The containers are identical in shape and are stacked vertically in a laterally offset relation. Therefore, rotating of the containers for stacking purposes is eliminated. In addition, the corrugations at the four corners of the container provide a column effect which increases the strength and rigidity of the containers.

Both longitudinal and lateral shifting of the containers in the stacked position is prevented by the engagement of the grooves in the skid with the upper edge of the lower container and by the engagement of the recess in the skid with the rim on the lower container.

In a modified form of the invention, a recess or pocket is provided in the flat rim of the container and the recess in the foot of the skid is eliminated. When the containers are in the stacked position, the groove in one foot of the skid on the upper container engages the upper edge of the side wall of the lower container and the other foot of the upper container rests in the pocket formed in the rim of the lower container.

In a second modified form of the invention, the flat rim connecting the corrugations is eliminated and the upper edge of the end wall follows the contour of the corrugations. In this embodiment, the feet of the skids are provided with a pair of intersecting grooves, one of which is adapted to engage the upper edge of the side wall of the lower container and the other groove is adapted to engage the upper edge of the end wall located at the area of the corrugation.

Other objects and advantages will appear in the course of the following description.

The drawings illustrate the best mode presently contemplated of carrying out the invention.

In the drawings:

Figure 1 is a top plan view of the container of the invention;

Fig. 2 is a vertical section of the container of the invention in which one container is shown in the nesting position and a second container shown in the stacking position;

Fig. 4 is a fragmentary bottom view of the container showing the construction of the skids;

Figure 3:
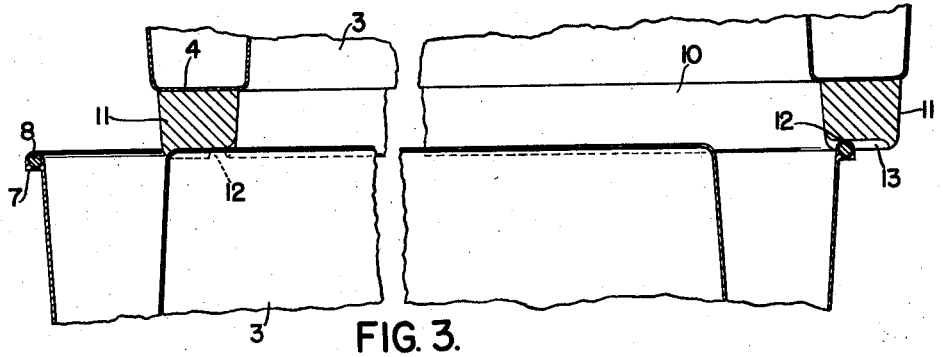
Fig. 3 is a vertical section taken along line 3—3 of Figure 1 and showing the containers in the offset stacking position.

The drawings illustrate a stackable and nestable container 1 which may be formed of plastic, sheet metal or the like. The container includes a pair of side walls 2 and a pair of end walls 3. A bottom wall 4 connects the side walls 2 and end walls 3 to provide an open top container.

To permit nesting of the containers, the side walls 2 and end walls 3 are tapered downwardly, as best shown in Fig. 2, so that the upper container can be inserted within the lower container and nested.

The end walls 3 of the container are provided with a pair of corrugations 5 which are located at the corners of the container and a generally flat rim 6 extends across the upper edge of the end walls 3 between the respective corrugations 5.

A peripheral, outwardly projecting flange 7 extends completely around the side walls 2 and the flat rim 6 of the container. The flange 7 is reinforced by a wire 8 or the like which is imbedded within the flange.

The bottom wall 4 of the container 1 carries a pair of generally U-shaped skids 9, each of which conforms to the contour of the end wall 3. More specifically, each skid 9 is provided with a generally transverse section 10 and a pair of longitudinally extending feet 11 which are disposed below the respective corrugations 5.

On nesting of the containers, the skids 9 on the upper container rest on the bottom wall 4 of the lower container to thereby space the flanges 7 on the upper container a substantial distance above the flanges of the lower container. This spacing of the flanges 7 enables the containers to be more readily handled and permits the prongs of a lift truck to be inserted between the spaced flanges to thereby remove the upper container from the lower container.

As best shown in Fig. 4, the bottom surface of each foot 11 is provided with both a longitudinally extending groove 12 and a recess or pocket 13 located at the outer end of the foot.

On stacking of the containers, as best shown in Fig. 3, the upper container is offset laterally from vertical alignment with the lower container with the grooves 12 in one pair of the feet 11 of the upper container engaging the flange 7 on the side wall 2 of the lower container. The recesses 13 in the other pair of feet 11 of the upper container rest on the edge of the corresponding rim 6 on the lower container. The depth of the recess 13 is equal to the depth of the groove 12 so that in the stacked position the container will be level.

The engagement of the grooves 12 with the flange 7 of the side wall prevents lateral shifting or movement of the stacked containers, and the engagement of the recesses 13 with the edge of the flat rims 6 prevents longitudinal relative movement between the containers. Thus, even though the containers are in an offset relation, they are locked or held against shifting or relative movement. Fig. 3 shows the stacking of two containers. However, if a third container is to be stacked on the second container, the third container would be in vertical alignment with the first container so that, in effect, each alternate container in the stack would be in alignment, thereby eliminating any tendency for tilting or tipping of the stack. Furthermore, the corrugations 5 in the end walls act as columns in the stacked position with the edges of the columns being in alignment. Thus, the load in the containers is transferred downwardly through the columns to the foundation on which the containers are resting.

The containers are particularly adaptable to be used with a lift truck, for the containers are stacked without the necessity of rotating the upper container 180° from the nesting position. The forks or fingers of the lift truck can engage the outwardly extending flange 7 extending around the top of the container and merely lift the container to the offset stacking position. In the stacked position, the container can also be handled by inserting the forks of the lift truck under the bottom wall 4 and between the skids 9.

Figures 5, 6:
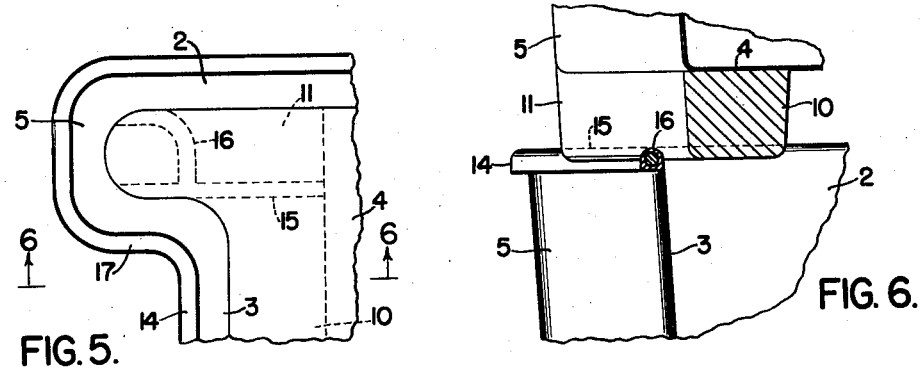
Fig. 5 is a fragmentary top plan view showing a modified form of the invention.
Fig. 6 is a view taken along line 6—6 of Fig. 5.
Figure 7:
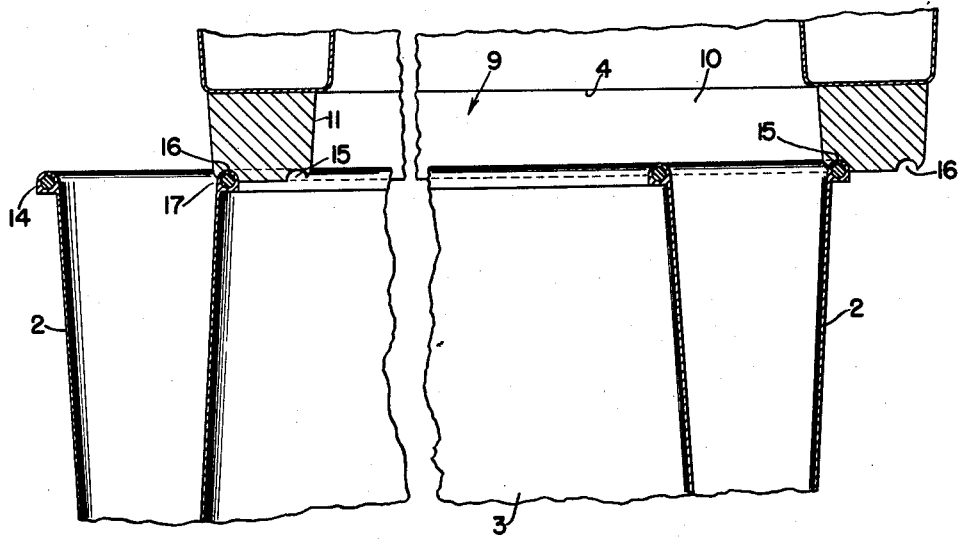
Fig. 7 is a vertical section of the container of Fig. 5 showing the containers in the stacked position.

In a second embodiment of the invention, as shown in Figs. 5 through 7, the container 1 has side walls 2, end walls 3 and a bottom wall 4 similar to that of the first embodiment. The end walls 3 are provided with corrugations 5 and an outwardly extending flange 14 follows the corrugations on the end wall so that the flat rim 6 of the first embodiment is eliminated. The flange 14 extends continuously around the side walls 2 and the end walls 3.

The skids 9 in this embodiment are similar in shape to the skids 9 of the first embodiment and each foot 11 is provided with a groove 15 corresponding to groove 12 in the first embodiment. In addition, each of the feet 11 is provided with a generally curved groove 16 which intersects the groove 15, as best shown in Fig. 5.

The containers are nested similar to that shown in the first embodiment with the skids 9 of the upper container resting on the bottom surface of the lower container. In stacking, the upper container is laterally offset from vertical alignment with the lower container, as shown in Fig. 7. In this position, the grooves 15 on one longitudinal pair of feet engage the flange 14 of the side wall 2, while the grooves 16 on the other longitudinal pair of feet engage the portion of the flange 14 bordering the corrugation 5 and indicated by 17. The engagement of the grooves 15 and 16 with the flange 14 prevents both lateral and longitudinal shifting of the containers and firmly positions the containers in a vertical stacked relation. As in the case of the first embodiment, the containers can be stacked without the requirement of rotating the upper container 180° from the nesting position and this facilitates the handling of the containers, particularly when using a mechanical means such as a lift truck.

Figure 8:
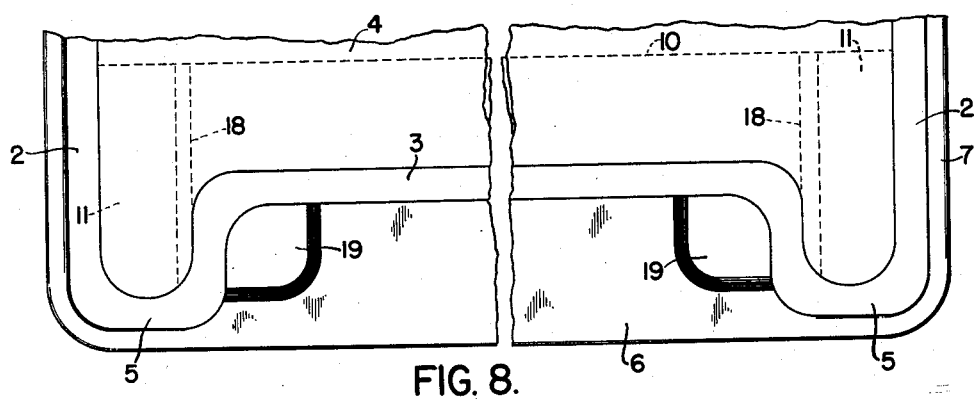
Fig. 8 is a fragmentary top plan view of a second modified form of the container.
Figure 9:
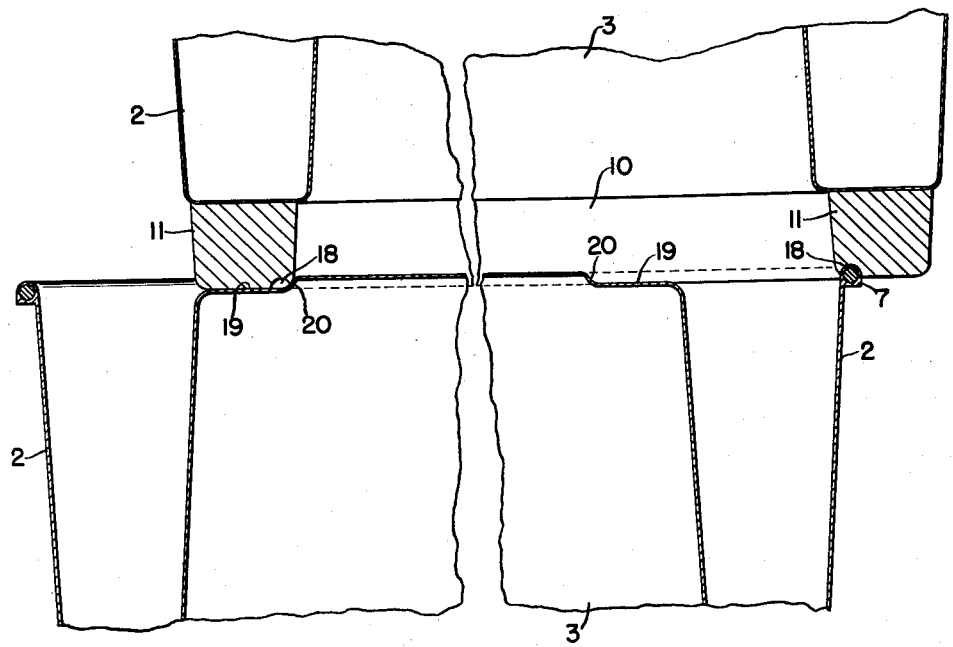
Fig. 9 is a vertical section showing a container of Fig. 8 in the stacked position.

The third embodiment, shown in Figs. 8 and 9, is similar to the first embodiment in which the flat rims 6 extend between the corrugations 5 and the flange 7 extends continuously around the side walls 2 and rims 6.

As in the first embodiment, the skids are generally U-shaped and the feet 11 of the skids are each provided with a longitudinally extending groove 18 corresponding to groove 12 of the first embodiment. In this modified form of the invention, a pair of recesses 19 are provided in each flat rim 6 rather than forming the recess in the feet 11 as in the first embodiment. As best shown in Fig. 8, the recesses 19 have a generally flat bottom which is connected to the rim 6 itself by a slanting surface 20.

In this embodiment, grooves 18 in one longitudinal pair of feet 11 engage the flange 7 associated with the side wall 2, while the other longitudinal pair of feet are disposed within the respective recesses 19 on the rim 6. The engagement of the grooves 18 with the flange 7 and engagement of the feet 11 with the recesses 19 prevents both lateral and longitudinal movement of the upper container with respect to the lower container.

As in the case of the first two embodiments, the stacking is accomplished without rotating the upper container 180°, but merely by moving the upper container to a laterally offset position.

The present invention provides a novel nestable and stackable container which eliminates the requirements of rotating the upper container 180° from the nesting position in order to stack the containers. This greatly simplifies the handling of the containers, particularly when using a lift truck or other mechanical handling means. Furthermore, the end walls of the containers are provided with corrugations which not only reinforce the containers but serve as columns in stacking so that the load is transferred downwardly through the columns to the foundation.

Various modes of carrying out the invention are contemplated as being within the scope of the following claims particularly pointing out and distinctly claiming the subject matter which is regarded as the invention.

We claim:

1. A stackable and nestable container, comprising a first pair of opposed walls with at least one of said first pair of walls sloping inwardly toward the other from top to bottom, a second pair of opposed walls with at least one of said second pair of walls sloping inwardly toward the other from top to bottom, said second pair of walls being connected to said first pair of walls along the side edges thereof, a bottom wall connecting the lower edges of said first pair of walls and said second pair of walls to provide a generally rectangular open top structure adapted to nest with a similarly oriented lower container, a pair of outwardly extending corrugations disposed in each of said pair of second walls with said corrugations being located adjacent the side edges of the second walls, the lower surface of said bottom wall having a groove disposed in parallel alignment with the upper edge of one of said first pair of walls and located substantially beneath one of said corrugations, the groove of one container being engageable with the upper edge of one of the first pair of walls of the next lower container when the containers are in the stacked position to provide a laterally offset stacking relationship, and means connected to the lower surface of the bottom wall and engageable with the upper edge portion of one of the second pair of walls of the next lower container and said means being positioned adjacent one of said corrugations when the containers are in the stacked position to thereby prevent relative movement of said container with respect to the lower container in the direction of said second pair of walls.

2. A stackable and nestable container, comprising a first pair of walls with at least one of said first pair of walls tapering downwardly and inwardly toward the other of said walls, a second pair of walls connected to said first pair of walls along the side edges thereof with at least one of said second pair of walls tapering downwardly and inwardly toward the other of said second walls, a bottom wall connecting said first pair of walls and said second pair of walls to provide a generally rectangular open top structure, a pair of outwardly extending corrugations disposed in each of said pair of second walls with said corrugations being located adjacent the side edges of the second walls, the lower surface of said bottom wall having a notch engageable with the upper edge of one of the first walls of the next lower container when the containers are in a vertically stacked position to thereby prevent lateral movement of said container with respect to the lower container in a direction toward said first wall, and means connected to the lower surface of the bottom wall and engageable with the upper edge portion of said second wall of the next lower container at a location adjacent one of said corrugations when the containers are in the stacked position to thereby prevent relative movement of said container with respect to the lower container in a direction toward said second walls.

3. A stackable and nestable container, comprising, a pair of side walls with at least one of said side walls sloping inwardly and downwardly toward the other of said side walls, a pair of end walls connected to said side walls along the side edges thereof with at least one of said end walls sloping inwardly and downwardly toward the other of said end walls, a bottom wall connecting the lower edges of said side and end walls to provide a generally rectangular open top container capable of nesting with a lower similarly oriented container, a pair of outwardly extending corrugations disposed in each end wall adjacent the side edges of said end walls, a foot depending from said bottom wall and having a recess therein disposed to engage the upper edge of one of the side walls of the next lower similarly oriented container when the containers are in a stacked relation to thereby prevent lateral shifting of the container, and a second foot depending from said bottom wall and spaced laterally from said first foot, said second foot disposed to engage the upper portion of the end wall of the next lower container at a location adjacent one of said corrugations in the end wall of said next lower container and thereby prevent longitudinal shifting of the stacked containers.

4. A stackable and nestable container, comprising, a pair of inwardly and downwardly sloping side walls, a pair of inwardly and downwardly sloping end walls connected to said side walls along the side edges thereof, a bottom wall connecting the lower edges of said side and end walls to provide a generally rectangular open top structure, a pair of outwardly extending corrugations disposed in each end wall adjacent the side edges of said end walls, a generally flat rim connecting the upper edges of the corrugations together at each end of said structure, a foot depending from said bottom wall and having a recess therein disposed to engage the upper edge of one of the side walls of the next lower similarly oriented container when the containers are in a stacked relation to thereby prevent lateral shifting of the container, and a second foot depending from said bottom wall and spaced laterally from said first foot and having a pocket therein, said pocket being disposed to engage the edge portion of the flat rim of the next lower container at a location adjacent one of said corrugations in the end wall to thereby prevent longitudinal shifting of the stacked containers in a direction toward said end walls.

5. The structure of claim 4, in which the depth of the recess in the first foot is substantially equal to the depth of the pocket in said second foot to permit level stacking of the containers.

6. A stackable and nestable container, comprising, a pair of downwardly and inwardly sloping side walls, a pair of downwardly and inwardly sloping end walls connected to said side walls along the side edges thereof, a bottom wall connecting the lower edges of said side and end walls to provide a generally rectangular open top container capable of nesting with a similarly oriented container, a pair of outwardly extending corrugations disposed in each end wall adjacent the side edges of said end walls, a generally flat rim connecting the upper edges of the corrugations together at each end of said structure, said rim having a recess disposed adjacent one of the corrugations, a foot depending from said bottom wall and having a groove therein disposed to engage the upper edge of one of the side walls of the next lower similarly oriented container when the containers are in a stacked relation to thereby prevent lateral shifting of the containers, and a second foot depending from said bottom wall and space laterally from said first foot, said second foot being disposed to engage said recess in said rim of the next lower container to thereby prevent longitudinal shifting of the stacked containers in a direction toward said end walls.

7. A stackable and nestable container, comprising, a pair of downwardly and inwardly sloping side walls, a pair of downwardly and inwardly sloping end walls connected to said side walls along the side edges thereof, a bottom wall connecting the lower edges of said side and end walls to provide a generally rectangular open top container, a pair of outwardly extending corrugations disposed in each end wall adjacent the side edges of said end walls, a generally flat rim connecting the upper edges of the corrugations together at each end of said structure, said rim having a recess bordering the corrugation located adjacent said opposite side wall, a foot depending from said bottom wall and located adjacent one of said side walls and having a notch disposed to engage the upper edge of the corresponding side wall of the next lower similarly oriented container to effect laterally offset stacking of the containers and prevent relative lateral shifting of the stacked containers, and a second foot depending from said bottom wall and located adjacent the opposite side wall, whereby said second foot is engageable with said recess in said rim of the next lower container to thereby prevent longitudinal shifting of the stacked containers in a direction toward said end walls, said sloping side walls and end walls permitting nesting of the containers with the feet on the upper container resting on the bottom wall of the next lower container to thereby space the upper edge of the upper container above the upper edge of said lower container.

8. The structure of claim 7, in which the depth of the notch is substantially equal to the depth of the recess in the rim to permit level stacking of the containers.

9. The structure of claim 7 and including a peripheral flange extending outwardly from the upper edge of said side walls and said rim, said flange on the upper container being spaced upwardly from the flange on the lower container when the containers are nested to facilitate upward removal of the upper container from the nested position.

10. A stackable and nestable container, comprising, a pair of downwardly and inwardly sloping side walls, a pair of downwardly and inwardly sloping end walls connected to said side walls along the side edges thereof, a bottom wall connecting the lower edges of said side and end walls to provide a generally rectangular open top container, a plurality of outwardly extending corrugations disposed in each end wall with a corrugation located adjacent each side edge of said end walls, a flange extending outwardly from the upper edge of said side walls and said end walls and following the contour of said corrugations, a foot depending from said bottom wall and located adjacent one of said side walls and having a groove disposed to engage the flange on the corresponding side wall of the next lower similarly oriented container when the containers are in a stacked relation to thereby prevent relative lateral shifting of the stacked containers, and a second foot depending from said bottom wall and located adjacent the opposite side wall and having a generally curved groove therein disposed to engage the flange on the corrugation located adjacent said opposite side wall to thereby prevent longitudinal shifting of the stacked containers in a direction toward said end walls.

11. A stackable and nestable container, comprising, a pair of longitudinal walls with at least one of said longitudinal walls sloping inwardly and downwardly toward the other of said longitudinal walls, a pair of transverse walls connected to said longitudinal walls along the side edges thereof with at least one of said transverse walls sloping inwardly and downwardly toward the other of said transverse walls, a bottom wall connecting the lower edges of said longitudinal and transverse walls to provide a generally rectangular open top container capable of nesting with a similarly oriented lower container, a pair of outwardly extending corrugations disposed in each transverse wall adjacent the side edges of said transverse walls, a pair of generally U-shaped skids connected to the lower surface of the bottom wall with each skid complementing the contour of the lower end of the respective transverse wall and each skid including a pair of feet with each foot being disposed beneath one of the corrugations in the respective transverse wall, one pair of longitudinally aligned feet having grooves extending parallel to the adjacent longitudinal walls and disposed to engage the upper edge of the longitudinal wall of the next lower similarly oriented container when the containers are in a stacked relation, and means provided on the other pair of longitudinally aligned feet for engaging the upper portion of the corresponding transverse wall of the next lower container at a location adjacent one of said corrugations in the end wall of said next lower container to thereby prevent longitudinal shifting of the stacked containers in a direction toward said end walls.

12. A stackable and nestable container, comprising, a pair of inwardly and downwardly sloping longitudinal walls, a pair of inwardly and downwardly sloping transverse walls connected to said longitudinal walls along the side edges thereof, a bottom wall connecting the lower edges of said longitudinal and transverse walls to provide a generally rectangular open top container capable of nesting with a similarly oriented lower container, a pair of outwardly extending corrugations disposed in each transverse wall adjacent the side edges of said transverse walls, and a pair of generally U-shaped skids connected to the lower surface of the bottom wall with each skid complementing the contour of the lower end of the respective transverse wall and each skid including a pair of feet with each foot being disposed beneath one of the corrugations in the respective transverse wall, one pair of longitudinally aligned feet having grooves extending parallel to the adjacent longitudinal walls, said grooves lying in a vertical plane passing through the corresponding corrugations and said grooves disposed to engage the upper edge of the longitudinal wall of the next lower similarly oriented container to effect laterally offset stacking of the containers with the corrugations of the upper container being at least in partial alignment with the corresponding corrugations of the lower container to provide a column effect at the corners of the stacked containers and transfer the load to the foundation on which the lowermost container in the stack is resting.

13. A stackable and nestable container, comprising a first pair of opposed walls with one of said first pair of walls sloping inwardly toward the other from top to bottom, a second pair of opposed walls with at least one of said second pair of walls sloping inwardly toward each other from top to bottom, said second pair of walls being connected to said first pair of walls along the side edges thereof, each of said second walls having a central concavity projecting inwardly toward the opposite second wall, a bottom wall connecting the lower edges of said first pair of walls and said second pair of walls to provide a generally rectangular open top structure adapted to nest with a similarly oriented lower container, said bottom wall having a recess disposed to engage the upper edge of one of the first walls of the next lower container when the containers are in stacked position and said bottom wall having a portion spaced from said recess and disposed to rest on at least one of said concavities of the next lower container to thereby support said container in an offset stacked relationship, and means removably interconnecting said portion of the bottom wall and at least one of said concavities for preventing relative movement of the container with respect to the next lower container in the direction of said second pair of walls when the containers are in the stacked position.

14. A stackable and nestable container, comprising a first pair of opposed walls with at least one of said first pair of walls sloping inwardly toward the other from top to bottom, a second pair of opposed walls with at least one of said second pair of walls sloping inwardly toward the other from top to bottom, said second pair of walls being connected to said first pair of walls along the side edges thereof, each of said second walls having a central inwardly offset portion facing the other of said second walls, and a bottom wall connecting the lower edges of said first pair of walls and said second pair of walls to provide a generally rectangular open top structure adapted to nest with a similar oriented lower container, the lower surface of said bottom wall having a recess disposed adjacent to one of said first walls and located to engage the upper edge of the corresponding first wall of the lower container when the containers are in a stacked position and said bottom wall having a portion spaced laterally from said recess and disposed to rest on at least one of said offset surfaces of the lower container to thereby support said container in an offset stacking relationship.

References Cited in the file of this patent
UNITED STATES PATENTS 2,765,099     Lively  ------------------ Oct. 2, 1956